June 12, 1923.
J. C. PRATT
POWER TRANSMISSION DEVICE
Filed April 9, 1921
1,458,499
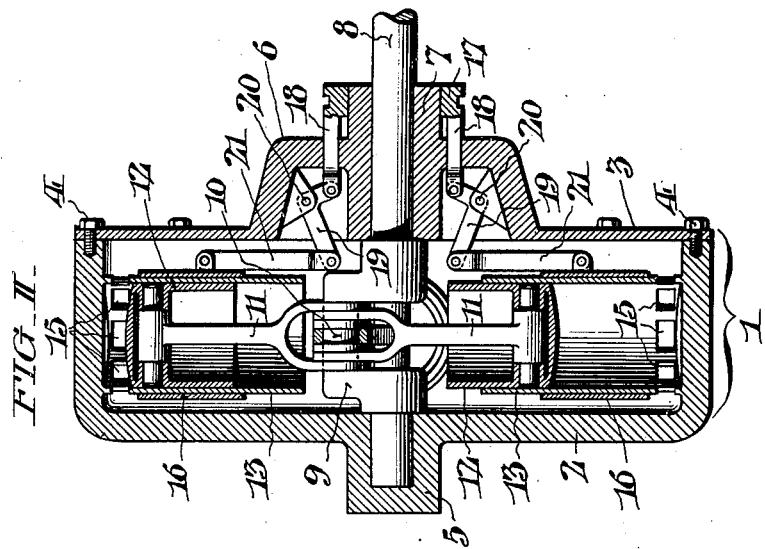
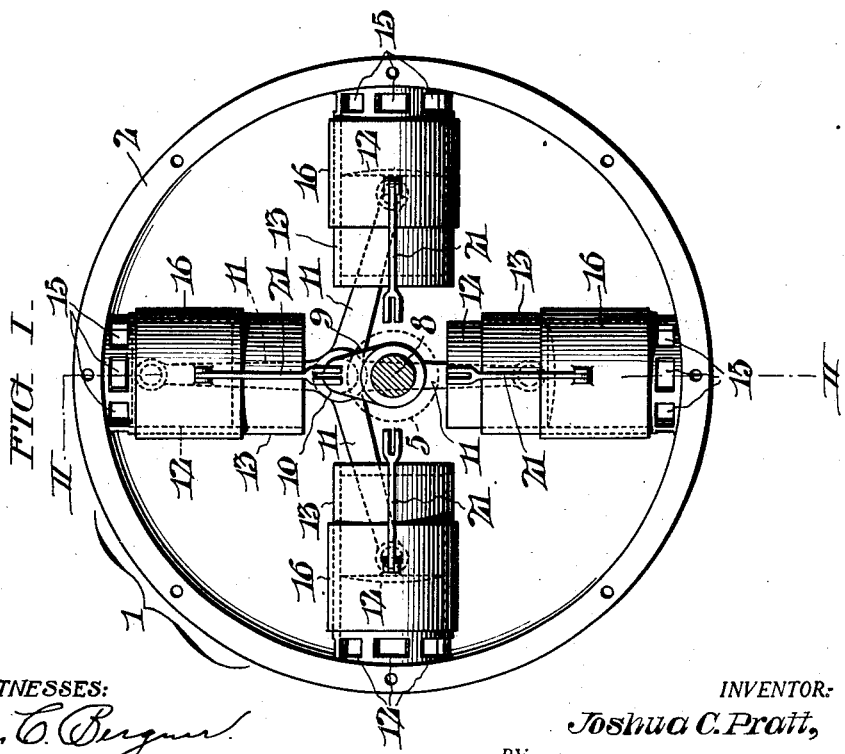
WITNESSES:
INVENTOR:
Joshua C. Pratt,
BY
ATTORNEYS.

Patented June 12, 1923.

1,458,499

UNITED STATES PATENT OFFICE.

JOSHUA C. PRATT, OF FRAMINGHAM, MASSACHUSETTS.

POWER-TRANSMISSION DEVICE.

Application filed April 9, 1921. Serial No. 460,056.

*To all whom it may concern:*

Be it known that I, JOSHUA C. PRATT, a citizen of the United States, residing in Framingham, in the county of Middlesex and State of Massachusetts, have invented certain new and useful Improvements in Power-Transmission Devices, whereof the following is a specification, reference being had to the accompanying drawings.

My invention relates generally to transmission devices, and more particularly to those of the type ordinarily known as "Hydraulic transmissions or clutches," whereby, under control of the flow of suitable liquid in a closed circuit or circuits, power may be transmitted, at variable speeds, from a driving element to a driven element.

The primary object of my invention is to secure higher efficiency, and greater simplicity, both as to construction and operation than attainable with devices heretofore designed for a similar purpose.

Other objects and attendant advantages of my invention will become apparent from the detailed description which follows:

In the drawings, Fig. I is an illustration in elevation of a power transmission device conveniently embodying my invention, the cover plate of the casing or housing thereof having been removed so as to expose to view the mechanism upon the interior; and Fig. II is an axial sectional view taken through the structure on the line II—II of the preceding figure.

As herein shown, the mechanism of the transmission device is housed within a casing having the form of a drum comprehensively designated by the numeral 1, said casing comprising a main cylindrical section or member 2 and a circular cover disk or plate 3, which are relatively secured by means of screw bolts such as shown at 4—4 in Fig. II. The main casing member 2 has an axial projection or boss 5 whereby it may be attached, for example, to the crank shaft of an automobile motor to serve in the capacity of a fly-wheel therefor. The cover plate 3 is formed with a hollow, frusto-conical protuberance 6 in turn having an integral axial boss 7 functional as a journal or bearing for a transmission shaft 8. Within the confines of the casing, the shaft 8 has formed in it, a crank 9, and its inner end, as best seen in Fig. II, is sustained for rotation in an axial bore of the boss 5 of the casing member 2. The pin 10 of the crank 9 is common to a series of connecting rods 11, whose outer ends are pivotally coordinated with the plunger pistons 12—12 of cylinders 13—13. Said cylinders, of which there are four in number, extend radially inward from the peripheral wall of the casing member 2, and, in practice, are either integrally formed with said casing member, or rigidly secured thereto in any approved manner. Adjacent their inner or base ends, the cylinders 13—13 communicate with the interior of the casing through lateral ports 15 adapted to be controlled by sleeves 16 slidably mounted about said cylinders. Said sleeves are axially shiftable under actuation of a collar 17 slidable on the external portion of the journal boss 7 of the casing cover member 3, said collar being connected by means of extension rods 18 reaching to the interior of the casing, to bell crank levers 19 which are fulcrumed about fixed pivots 20 within the protuberance 6 of the cover member, and in turn pivotally connected through radially disposed links 21 with the aforesaid sleeves.

In practice, the casing is filled with a suitable liquid, preferably lubricating oil, which, under the pumping action of the plunger pistons 12—12, is drawn into, and expelled through the ports 15 of the cylinders, the extent of port opening controlled by the shifting mechanism for the sleeves 16 determining the rate of flow, and in turn the extent of free reciprocation of the pistons, thus allowing a certain amount of slippage between the casing 1, as a whole, and the driven transmission shaft 8 which carries the load with the result that the latter may be caused to rotate at different speeds.

The operation of the device may be briefly described as follows:

With the assumption that the ports 15 are fully open, as shown in the illustration, it will be apparent that as the casing 1 revolves bodily and the attached cylinders 13—13 with it, the pistons 12—12 are free to reciprocate idly under the reaction of the load which tends to hold the transmission shaft 8 from revolving, the liquid being, as a result, continuously drawn into and expelled from the cylinders through said ports. However, as the ports are partly closed by simultaneously shifting the control sleeves 16, the surging of the liquid as above noted, is correspondingly restricted and the free movement of the plunger pistons proportionately retarded. Under these conditions, the transmission shaft is driven in the same direction as the casing 1, but at a slower speed depending upon the amount of slippage allowed between the driving and the driven element under the restricted flow of the liquid in the closed system. As the sleeves are gradually moved to close the ports entirely, under similar reasoning, it will at once be seen that the speed of the driven shaft increases and gradually approaches that of the casing 1, and under complete closure of the ports, the transmission shaft will obviously be obliged to revolve in absolute synchronism with the casing 1 owing to the incompressibility of the liquid which will then be trapped in the several cylinders of the system.

From the foregoing, it will be apparent that any desired speed of the driven transmission shaft, limited only by that of the maximum speed of the casing 1, may be had by proper control of the sleeve actuating mechanism.

Having thus described my invention, I claim:

1. A hydraulic, power transmission device comprising a rotary casing, a plurality of cylinders fixed to the inner periphery of the casing and extending radially in an inward direction, each cylinder having a series of apertures formed adjacent its outer end, a sleeve embracing each cylinder and slidable longitudinally to vary the aperture of said openings, a concentric shaft having a crank portion, pistons slidable in the cylinders with piston rod connections to the crank portion, and means for simultaneously shifting the sleeves.

2. A hydraulic, power transmission device comprising a casing, a plurality of inwardly directed cylinders carried thereby and having openings, a sleeve embracing each cylinder and slidable longitudinally to vary the aperture of the opening, a cylindrical shaft having a crank portion with connections to pistons operating in the cylinders, an extension of the casing enclosing the shaft, a grooved ring slidable on the extension, rods formed with the ring and operating through openings in the casing, bell cranks mounted within the casing for connection to said rods, and links forming a connection between the bell cranks and sleeves.

3. A hydraulic, power transmission device comprising a driving member in the form of a closed, revolving, liquid filled drum casing; a series of relatively fixed cylinders extending radially inward from the peripheral wall of the drum casing, said cylinders having formed in them, adjacent their base ends, a series of ports for communication with the interior of the casing; plunger pistons reciprocatory within the cylinders; a transmission shaft extending axially to the interior of the casing, and having a crank formed therein; connecting rods whereby the plunger pistons are coordinated with the crank of said shaft; sleeves slidably mounted about the cylinders for controlling the flow of the fluid through the aforesaid ports to check, to variable degrees, the free reciprocation allowed the plunger pistons; and mechanism for simultaneously shifting said sleeves including a collar slidable upon an external axial boss of the casing, said collar having rods extending to the interior of said casing; radially disposed links pivoted at one end to the sleeves; and bell crank levers interposed between the ends of the links and the rods of the aforesaid collar.

In testimony whereof, I have hereunto signed my name at Framingham, Massachusetts, this fifth day of April, 1921.

JOSHUA C. PRATT.

Witnesses:
RAYMOND J. CALLAHAN,
CHARLES T. LEMOINE.